United States Patent [19]

Grigaliunas

[11] 4,168,886
[45] Sep. 25, 1979

[54] FILM THREADING ASSEMBLY FOR A MOTION PICTURE FILM PROJECTOR

[75] Inventor: Raimundas Grigaliunas, Forest Park, Ill.

[73] Assignee: Bell & Howell Company, Chicago, Ill.

[21] Appl. No.: 947,666

[22] Filed: Oct. 2, 1978

[51] Int. Cl.² .............................................. G03B 1/56
[52] U.S. Cl. .................................................. 352/157
[58] Field of Search ....................... 352/157, 158, 159

[56] References Cited
U.S. PATENT DOCUMENTS

| 4,037,949 | 7/1977 | Pasturczak | 352/158 |
| 4,087,165 | 5/1978 | Pasturczak | 352/157 |

Primary Examiner—Monroe H. Hayes
Attorney, Agent, or Firm—Robert M. Ward; Roger M. Fitz-Gerald

[57] ABSTRACT

For motion picture film projectors generally of the type having a projection slot on the housing thereof, the improvement comprising an inwardly sloped dynamic frusto-conical film guide surface on the film guide roller, the frusto-conical film guide surface having an axis of rotation congruent with that of the film guide roller and disposed at the free end thereof and sloping toward the journaled end thereof to form an inwardly sloped dynamic film guide surface; and an outwardly sloped dynamic frusto-conical film guide surface disposed on each film threading roller, each such outwardly sloped dynamic frusto-conical film guide surface being disposed to slope away from the journaled end of the film threading roller, whereby upon introduction of the film onto the outwardly sloped dynamic frusto-conical film threading surface, the film will tend to climb the surface in a direction toward the journaled end of the film threading roller to bias the film into the projection slot and to maintain the film therein during projection.

13 Claims, 5 Drawing Figures

FILM THREADING ASSEMBLY FOR A MOTION PICTURE FILM PROJECTOR

BACKGROUND OF THE INVENTION

The present invention relates in general to motion picture projectors of the slot-loading type having a projection slot, and more particularly to improvements in the housing thereof including the film threading assembly for the projection slot for greater ease and reliability of threading, biasing, and maintaining the motion picture film in proper alignment for projection within the projection slot.

In the prior art, users of motion picture film projectors have frequently experienced difficulty in threading the film into the motion picture projector. Part of the difficulty has arisen because of the long and circuitous threading route which has been typical of such prior art manual threading systems. In such systems, it has been generally necessary to thread the film manually around a number of toothed sprockets, through the film shuttle and around a sound drum, while placing the perforations in the film in mesh with the teeth of the appropriate sprocket, while enclosing the guide members and while holding the film in contact with the sprockets. It has also been necessary to manually establish loops of the correct lengths between the drive sprockets on either side of the film shuttle intermittent advance mechanism.

In practice, it sometimes is found that threading of the film in a projector of this type is a complicated and difficult operation. If the film is threaded incorrectly, it is likely to be damaged and to cause unsatisfactory performance of the projector.

In order to overcome this and other difficulties associated with manual threading of the film, many "self-threading" projectors have been proposed, some of which have been commercially produced. In such a "self-threading" projector, the end of the film is generally introduced endwise into a slot, which then directs the film end to a first toothed sprocket, which sprocket hopefully engages the film perforations and drives the film forward when the mechanism is in motion. The end of the film strip is then guided by a series of curved members which force it to travel in succession to another part of the film drive system, where the film end is engaged successively by various other driving members and sprockets. When the leading end of the film has been carried through a complete threading path, the film emerges from the mechanism and is attached to a takeup reel.

These "self-threading" projectors have alleviated some of the difficulties found in manual threading projectors, but have nonetheless displayed several residual and new disadvantages. In view of such disadvantages, the slot loading projector has been developed. In one such slot loading projector, such as is shown in U.S. Pat. No. 3,259,291 to Maurer, for example, the housing thereof includes a slot for confining and containing the film during projection thereof. The opposite ends of such projection slot have stationary film guide members, which may be in the form of an inclined surface, such as a truncated cone or may include larger extended edge portions, such as for example ridges. In either case, the surface of the film guide member is inclined such that a strand of film placed around either guide member and subjected to a slightly endwise tension will slide laterally and downwardly in the direction of the slant of the guide member into the slot for projection.

While the above stationary slot loading mechanism has been functional in general, improvements in the reliability and functioning thereof are deemed desirable.

SUMMARY OF THE INVENTION

An object of the present invention is to provide a new and reliable improvement in the housing of a film threading assembly for the projection slot of a motion picture film projector for threading, biasing, and maintaining the motion picture film in proper alignment for projection within the projection slot.

Another object of the present invention is to provide means whereby upon introduction of the film into the film threading surface the film will climb the surface in a direction toward the journaled end of the film threading roller to bias the film into the projection slot and to maintain the film therein.

In accordance with the above and other objects of the present invention, the film threading assembly of the present invention provides, in a motion picture film projector having a supply reel, a takeup reel and a housing having a projection slot therein, an inwardly sloped dynamic frusto-conical surface having an axis of rotation congruent with that of the film guide roller, the frusto-conical film guide surface disposed at the free end of the film guide roller and sloping toward the journaled end of the film guide roller to form an inwardly sloped dynamic film guide surface. An outwardly sloped dynamic frusto-conical film guide surface is disposed on each film threading roller, which film threading rollers are disposed distally of the film guide roller with respect to the projection slot. Each such outwardly sloped dynamic frusto-conical film guide surface is disposed to slope away from the journaled ends of the film threading rollers, whereby upon introduction of the film to the outwardly sloped dynamic frusto-conical film threading surface, the film will tend to climb the surface in a direction toward the journaled end of the film threading roller.

Other objects, features and advantages of the film threading assembly of the present invention will become apparent to one skilled in the art from the following detailed description taken in connection with the accompanying drawings.

DETAILED DESCRIPTION OF PREFERRED EMBODIMENTS

Figure 1:
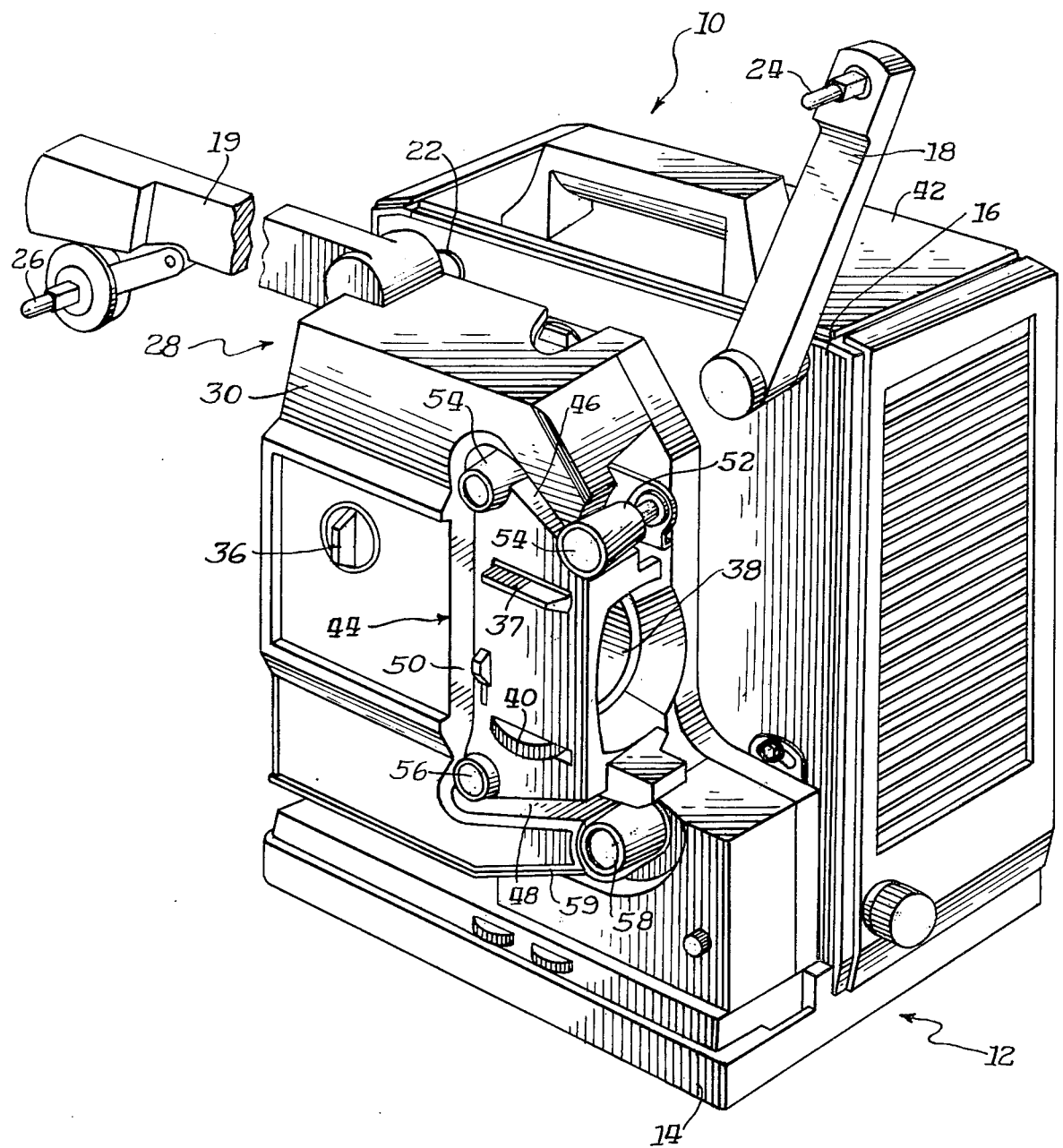
FIG. 1 is a perspective view of a motion picture projector showing the film threading assembly of the present invention in the housing thereof.

The improved film threading assembly of the present invention is utilized in connection with a motion picture film projector having a supply reel for storing the film prior to the projection thereof and a takeup reel for storing film after projection thereof. The motion picture film projector has a housing, which housing includes a projection slot having a proximal end adjacent to the supply reel for receiving the film, a distal end adjacent to a takeup reel for discharging the film, and a central portion adjacent a projection lamp for illumination and projection of the film. The projection slot includes means for controlling and confining the film path longitudinally and laterally in relationship to the projection lamp. The housing further carries a film guide roller having an attached, journaled end for rotation thereof and a free end for receiving the film.

The housing also carries preferably two or more film threading rollers, at least one of which is disposed near the distal end of the projection slot. The film threading rollers have axes of rotation substantially normal to the projection slot, and each has a journaled end for rotation thereof and a free end for receiving the film.

The film threading assembly of the present invention used in connection with the above motion picture film projector includes an inwardly sloped dynamic frusto-conical film guide surface on the film guide roller. The frusto-conical film guide surface has an axis of rotation congruent with that of the film guide roller, and the frusto-conical film guide surface is disposed at the free end of the film guide roller to slope toward the journaled end of the film guide roller. The result is to form an inwardly sloped dynamic film guide surface which causes the film initially to climb the surface in a direction away from the journaled end of the film guide roller.

The film threading assembly of the present invention further includes an outwardly sloped dynamic frusto-conical film guide surface disposed on each film threading roller. Each such outwardly sloped dynamic frusto-conical film guide surface is disposed to slope away from the journaled end of the corresponding film threading roller. The result is that upon introduction of the film onto the outwardly sloped dynamic frusto-conical film threading surface, the film will tend to climb the surface in a direction toward the journaled end of the film threading roller, thereby to bias the film into the projection slot and to maintain the film therein.

The film threading assembly of the present invention may preferably further include at least one projection roller, each of which projection roller is separate from, but has an axis of rotation substantially congruent with that of the corresponding threading roller. Each such corresponding projection roller is disposed in spaced relationship with respect to the journaled end of the corresponding film threading roller for receiving the film from the corresponding film threading roller, and thereafter for moving the film longitudinally in and through the projection slot in relationship to the projection lamp for illumination and projection thereof. A static surface may be disposed between the projection roller and the corresponding film threading roller. Such static surface, if present, is preferably sloped inwardly toward the respective projection roller.

Referring now to the drawing, the projector 10 used in connection with the film threading assembly of the present invention includes a T-shaped frame generally designated as 12, a flat base portion 14 and an upstanding mounting flange or wall 16. A preferably foldable pair of reel support arms 18, 19 that are preferably pivotably mounted from the top portion of wall 16 are provided and include detent means 22 for holding the arms 18, 19 in their extended position, as shown in FIG. 1 for film projection. A supply reel 20 and a takeup reel 21 (see FIG. 2) are mounted upon reel support arms 18, 19 at reel pivots 24, 26 respectively.

Figure 2:
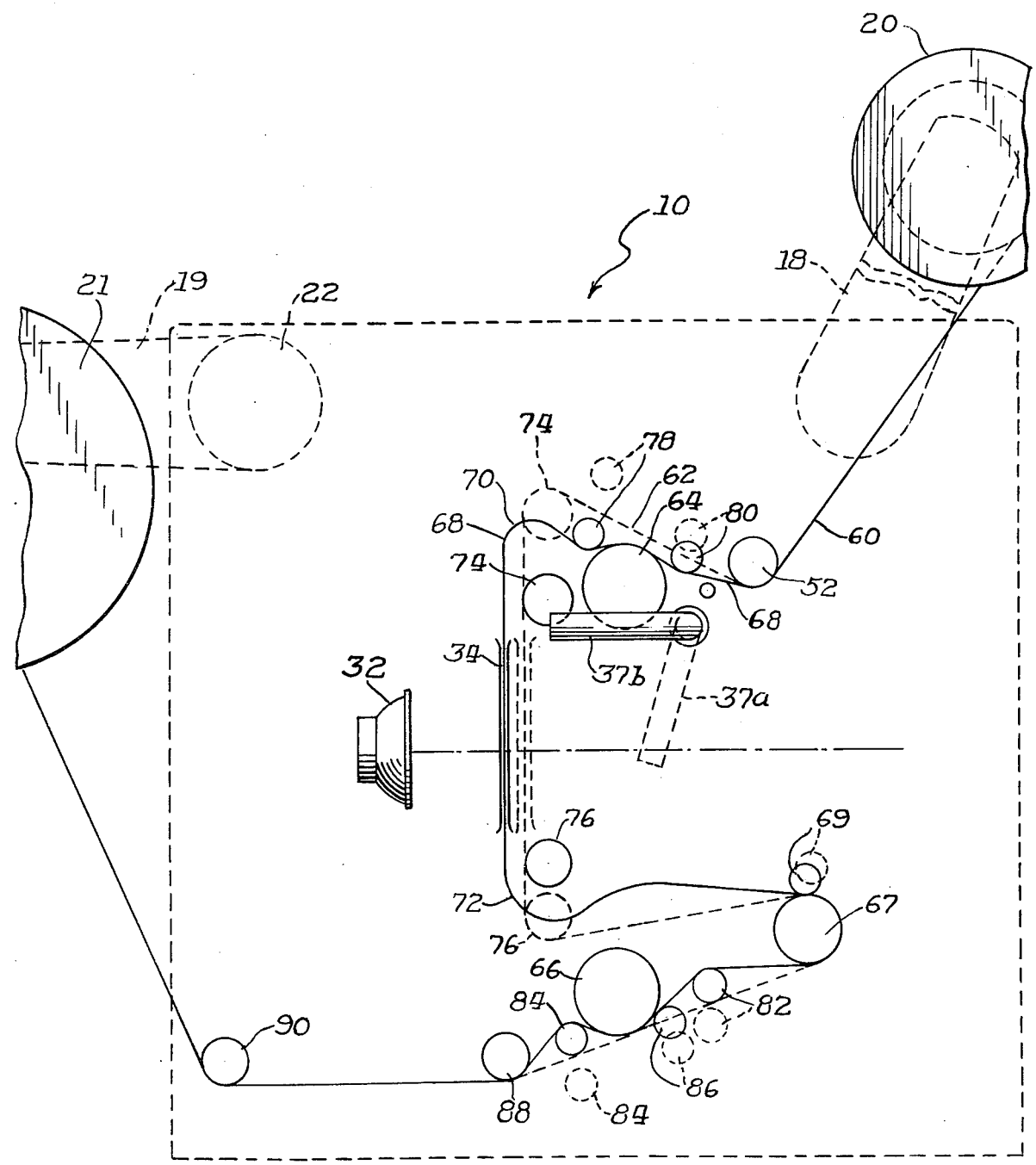
FIG. 2 is a partial schematic front elevational view of the film path through the motion picture projector as shown in FIG. 1 with the solid lines showing the closed or operative position, and the dotted lines depicting the open or loading position.
Figure 4:
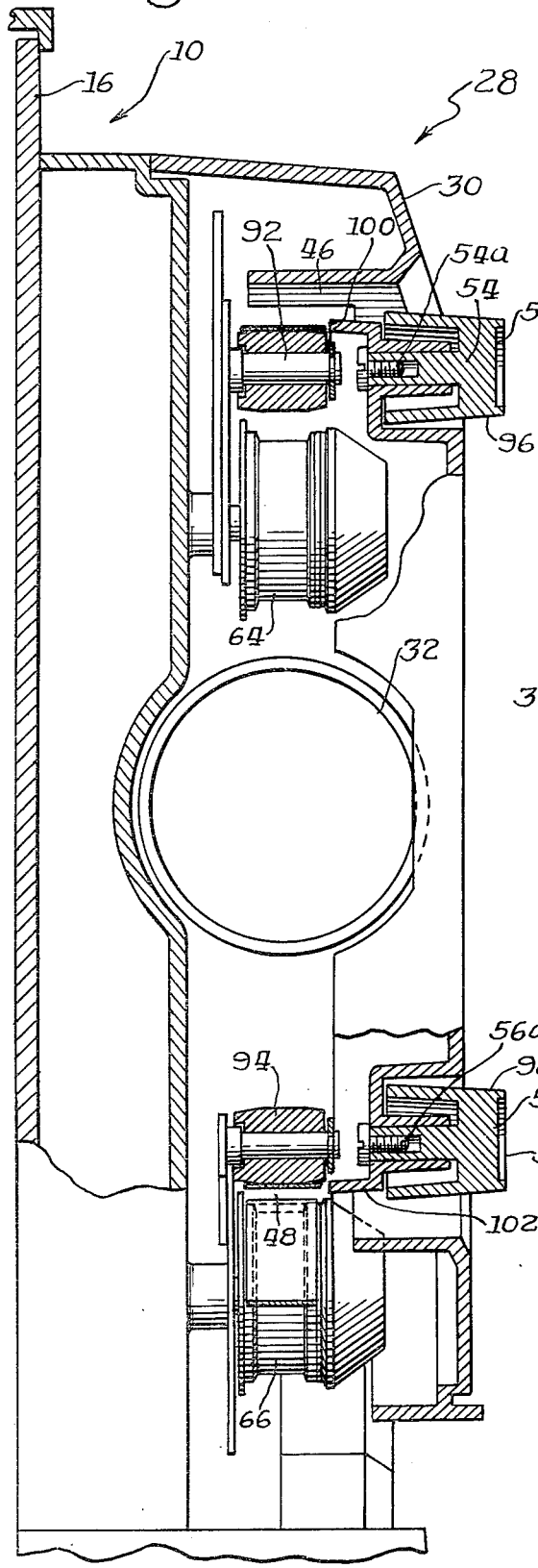
FIG. 4 is a cross-sectional view taken along lines 4—4 of FIG. 3 showing, inter alia, proximally and distally disposed film threading rollers, each having a corresponding outwardly sloped dynamic frustoconical film guide surface.
Figure 5:
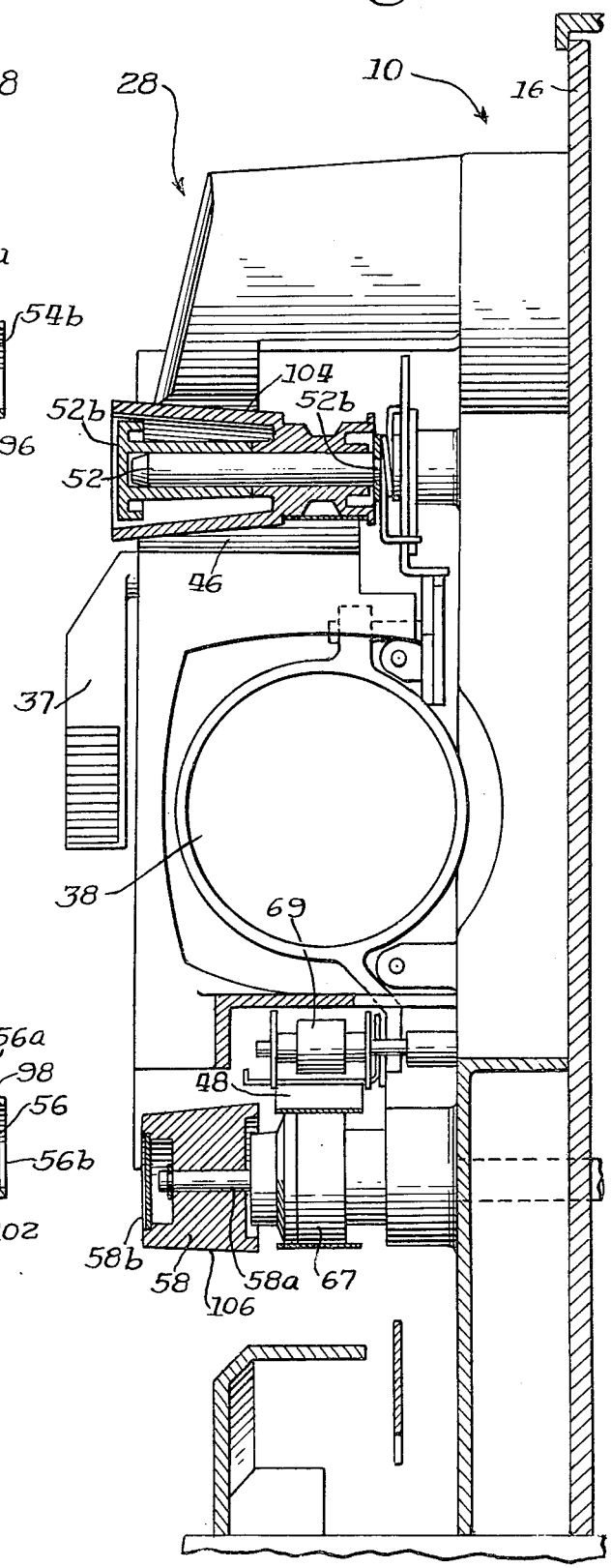
FIG. 5 is a cross-sectional view taken along lines 5—5 of FIG. 3 showing, inter alia, the inwardly sloped dynamic frusto-conical film guide surface on the film guide roller and the distally disposed projection guide roller.

A housing generally 28 is mounted upon wall 16 and includes a pivotably mounted cover 30 which covers a projection lamp 32 behind the film gate 34 (see FIGS. 2, 4 and 5). A power control switch 36 is mounted for ease of access to the user and permits transporting of the film in either the forward or reverse direction with or without the projection lamp illuminated. A main control lever 37 is likewise provided, such main control lever 37 being carried by housing 28. The projection lense (not shown) is mounted within the lense assembly 38 which includes a focusing knob 40 for adjusting the focus of the image. The projector 10 is provided with a removable cover (not shown) which protects the front of the projector during transportation thereof. A cavity is provided rearwardly of the wall 16 by the housing portion 42 for the drive motor, audio amplifier and other components (not shown).

Figure 3:
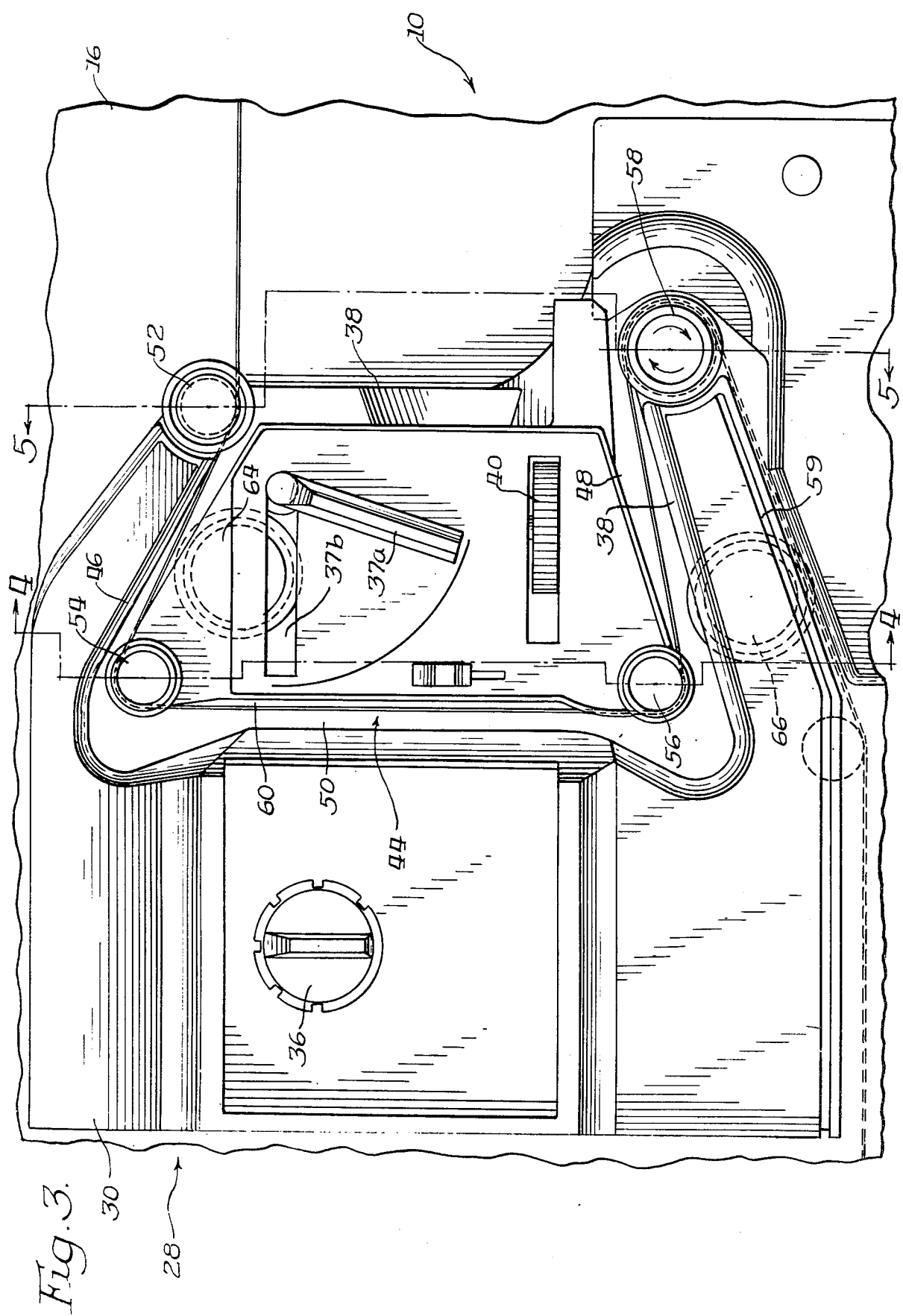
FIG. 3 is an enlarged side elevational view showing the film guide roller with its inwardly sloped dynamic frusto-conical film surface, the projection slot, two film threading rollers disposed in the projection slot and each having an outwardly sloped dynamic frustoconical film guide surface, and a post-projection guide roller for directing the film to the takeup reel (not shown)

With regard especially to FIG. 3, housing 28 of projector 10 contains a projection slot 44 having a proximal portion 46 adjacent supply reel 20 for initially receiving the film. Projection slot 44 further includes a distal portion 48 adjacent to the takeup reel 21 for discharging the film and a central portion 50 adjacent lamp 32 for illumination and projection of the film.

Housing 28 further includes a film guide roller 52. Housing 28 further carries a plurality of film threading rollers 54, 56, at least one of which (roller 54) is disposed at distal end 48 of projection slot 44. Housing 28 further carries a projection guide roller 58 which is disposed at the distal end of projection slot 40 and at the proximal end of post-projection portion 59 of projection slot 44, which portion directs the film to takeup reel 21.

As depicted particularly in FIG. 1, proximal portion 46 of projection slot 44 is disposed at an acute angle with respect to the central portion 50 thereof. Distal portion 48 of projection slot 44 is likewise disposed at an acute angle with respect to central portion 50 of projection slot 44, with film threading roller 54 disposed near the junction thereof. Post-projection portion 59 of projection slot 44 is also disposed at an acute angle with respect to the distal portion of projection slot 44, and with the post-projection roller 58 disposed at the juncture thereof. Thus, in the embodiment shown in FIG. 1, wherever there is an abrupt change in direction of the film movement, a roller is supplied to assist such film transport.

The film guide means hereof, as shown schematically in FIG. 2, comprises a plurality of moveable elements generally mounted within projection slot 44 so that the film strip 60 may be guided into projection slot 44. The various elements of the threading assembly of the present invention are in general operated by the main control lever 37. The moveable elements of the film threading assembly of the present invention are all moveable between a closed or operative position (as shown by the solid lines in FIG. 2) and an open or loading position (as shown by the dotted lines in FIG. 2). When loading a film 60, the film 60 will generally follow the broken line path 62 as shown in FIG. 2. In this loading position, the control lever 37 is in its lowermost position, as represented by dotted line 37a, whereby the film 60 clears a feed sprocket 64, a takeup sprocket 66, the open film gate or shuttle 34 and is wrapped thereafter around the sound drum 67 and urged thereagainst by sound drum roller 69. Once the film 60 has been lowered, the control lever 37 is moved upwardly to its closed or operative position 37b, which generally moves the film 60 to the solid line path 68, having an upper loop 70 and a lower loop 72 effectively on either side of the film gate 34, and wraps the film 60 about the sprockets 64, 66 for projection runs in either the forward or reverse direction.

The schematic diagram of FIG. 2 further shows a multiplicity of film handling and directing rollers, including, inter alia, upper loop forming roller 74, lower loop forming roller 76, upper guide rollers 78, 80, and lower biasing roller 82, sprocket wrapping rollers 84, 86, snubber roller 88 and final stationary exit roller 90.

Referring now to FIG. 4 in particular, film threading rollers 54, 56 have associated therewith corresponding projection rollers 92, 94 which are disposed in spaced relationship to the journaled ends 54a, 56a of film threading rollers 54, 56 respectively. Film 60 is received by such projection rollers 92, 94 from the corresponding film threading roller, and thereafter move the film 60 within projection slot 40 in relationship to the projection lamp 32 for illumination and projection in association with upper and lower sprockets 64, 66 respectively.

Film threading rollers 54, 56 also comprise outwardly sloped frusto-conical film guide surfaces 96, 98 respectively, which slope away from journaled ends 54a, 56a respectively of film threading rollers 54, 56. Such surfaces 96, 98 are rotational, i.e. dynamic, surfaces. Accordingly when film 60 is introduced thereupon, film 60 will tend to climb surfaces 96, 98 in a direction toward journaled ends 54a, 56a and away from free ends 54b, 56b respectively of the film threading roller 54, 56. Static and preferably inwardly sloped surfaces 100, 102 may be disposed between film threading roller 54 and projection roller 92, and between film threading roller 56 and projection roller 94, respectively. In an alternative preferred embodiment, film threading roller 54 and projection roller 92 may be integrally formed and static surface 100 eliminated. Likewise, film threading roller 94 may be integrally formed with the omission of static surface 102.

Referring now to FIG. 5 in particular, film guide roller 52 is disposed on housing 28 to project substantially normal to proximal portion 46 of projection slot 40, film guide roller 52 having a journaled end 52a and a free end 52b. Disposed therebetween on film guide roller 52 is inwardly sloped frusto-conical film guide surface 104, which slopes inwardly toward journaled end 52a and away from free end 52b. Surface 104 is rotational, i.e. dynamic and the function of surface 104 is to cause film 60 initially to climb surface 104 toward free end 52b to bias film 60 into the projection slot 40.

Post-projection roller 58 is disposed to have an axis of rotation substantially normal to distal portion 48 of projection slot 40, and has a journaled end 58a and a free end 58b. An outwardly sloped dynamic frusto-conical surface 106 is disposed therebetween for causing film 60 to be urged toward sound drum 67 for engagement between sound drum roller 69 and sound drum 67. In alternative embodiments for silent films, this feature may be omitted.

The basic and novel characteristics of the improved film threading assembly of the present invention will be readily understood from the foregoing disclosure by those skilled in the art. It will become readily apparent that various changes and modifications may be made in the form, construction and arrangement of the improved film threading assembly of the present invention as set forth hereinabove without departing from the spirit and scope of the invention. Accordingly, the preferred and alternative embodiments of the present invention set forth hereinabove are not intended to limit such spirit and scope in any way.

What is claimed is:

1. In a motion picture film projector having a supply reel for storing the film prior to projection thereof and a takeup reel for storing the film after projection thereof, the motion picture film projector having a housing, the housing including a projection slot having a proximal end adjacent the supply reel for receiving the film, a distal end adjacent the takeup reel for discharging the film, and a central portion adjacent a projection lamp for illumination and projection of the film, the projection slot including means for controlling and confining the film path longitudinally and laterally in relationship to the projection lamp, the housing further carrying a film guide roller having an attached journaled end for rotation thereof and a free end for receiving the film, the housing also carrying at least one threading roller, at least one of which is disposed at the projection slot removed from the proximal end thereof, the threading roller having an axis of rotation substantially normal to the projection slot, the film threading roller having a journaled end for rotation thereof and a free end for receiving the film, the improvement in the housing of a film threading assembly for the projection slot for threading, biasing and maintaining the motion picture film in proper alignment for projection within the projection slot, said film threading assembly comprising:

an inwardly sloped dynamic frusto-conical film guide surface on the film guide roller, said frusto-conical film guide surface disposed at the free end of the film guide roller to slope toward the journaled end of the film guide roller to form an inwardly sloped dynamic film guide surface; and an outwardly sloped dynamic frusto-conical film guide surface disposed on each film threading roller, each said outwardly sloped dynamic frusto-conical film guide surface being disposed to slope away from said journaled end of the film threading roller, whereby upon introduction of the film onto said outwardly sloped dynamic frusto-conical film threading surface, the film will tend to climb said surface, which climb is in a direction toward the journaled end of the film threading roller to bias the film into the projection slot and to maintain the film therein.

2. The improvement of claim 1 further comprising at least one projection roller, each being separate from but having an axis of rotation substantially congruent with that of the corresponding threading roller.

3. The improvement of claim 2 wherein each said projection roller is disposed in spaced relationship with respect to the journaled end of the corresponding film threading roller for receiving the film from the corresponding film threading roller and thereafter for moving the film in the projection slot in relationship to the projection lamp for illumination and projection thereof.

4. The improvement of claim 3 further comprising a static surface disposed respectively between each said projection roller and the corresponding film threading roller.

5. The improvement of claim 4 wherein each said static surface is sloped inwardly toward the respective projection roller.

6. The improvement of claim 2 wherein at least one said projection roller is integrally formed with the corresponding film threading rollers.

7. The improvement of claim 1 wherein the projection slot includes a proximal portion near the proximal end thereof which is disposed at an acute angle with respect to the central portion of the projection slot.

8. The improvement of claim 7 wherein a film threading roller is disposed near the juncture of said proximal portion of said central portion of the projection slot.

9. The improvement of claim 1 wherein the projection slot includes a post-projection portion the initial part of which is fed by and is disposed at an acute angle with respect to the central portion of the projection slot.

10. The improvement of claim 9 wherein a film threading roller is disposed near the juncture of said initial part of said post-projection portion and said central portion of the projection slot.

11. The improvement of claim 9 further comprising post-projection guide means, which comprises:
a post-projection guide roller disposed in said post-projection portion of the projection slot and having an axis of rotation substantially normal to the projection slot, said post-projection guide roller having a journaled end for rotation thereof and a free end for receiving the film and further having a frusto-conical film guide surface having an axis of rotation congruent with that of said post-projection guide roller disposed to slope away from said journaled end of said post-projection guide roller to form an outwardly sloping dynamic surface, whereby upon introduction of the film onto said post-projection guide roller outwardly sloping dynamic surface the film will tend to climb said dynamic sloped surface in a direction toward the journaled end of said post-projection guide roller, thereby to maintain the film substantially aligned and confined within the projection slot for collection on the takeup reel.

12. The improvement of claim 11 wherein said post-projection portion of the projection slot includes a distal portion thereof, said distal portion being disposed at an acute angle with respect to said post-projection portion and rearwardly toward the takeup reel.

13. The improvement of claim 12 wherein said post-projection guide roller is disposed near the juncture between said post-projection portion and the distal portion of the projection slot.

* * * * *

UNITED STATES PATENT AND TRADEMARK OFFICE
CERTIFICATE OF CORRECTION

PATENT NO. : 4,168,886
DATED : September 25, 1979
INVENTOR(S) : Raimundas Grigaliunas It is certified that error appears in the above-identified patent and that said Letters Patent are hereby corrected as shown below:

Claim 8, line 3, change "of" (first occurrence) to --and--.

Signed and Sealed this

Third Day of November 1981

[SEAL]

Attest:

Attesting Officer

GERALD J. MOSSINGHOFF

Commissioner of Patents and Trademarks